United States Patent
Paroski et al.

(10) Patent No.: US 10,620,925 B2
(45) Date of Patent: *Apr. 14, 2020

(54) CODE GENERATION FOR QUERIES IN A DATABASE SYSTEM

(71) Applicant: MemSQL, Inc., San Francisco, CA (US)

(72) Inventors: Andrew John Paroski, San Francisco, CA (US); Michael Adams Andrews, San Francisco, CA (US); Eric Norman Hanson, Bellevue, WA (US)

(73) Assignee: MemSQL, Inc., San Francisco, CA (US)

( * ) Notice: Subject to any disclaimer, the term of this patent is extended or adjusted under 35 U.S.C. 154(b) by 201 days.

This patent is subject to a terminal disclaimer.

(21) Appl. No.: 15/474,787

(22) Filed: Mar. 30, 2017

(65) Prior Publication Data

US 2018/0260437 A1 Sep. 13, 2018

Related U.S. Application Data

(63) Continuation of application No. 15/457,688, filed on Mar. 13, 2017.

(51) Int. Cl.
*G06F 9/44* (2018.01)
*G06F 8/41* (2018.01)
*G06F 16/242* (2019.01)
*G06F 16/2453* (2019.01)

(52) U.S. Cl.
CPC .......... *G06F 8/447* (2013.01); *G06F 16/242* (2019.01); *G06F 16/2453* (2019.01)

(58) Field of Classification Search
CPC ......... G06F 16/2443; G06F 8/41; G06F 8/427
See application file for complete search history.

(56) References Cited

U.S. PATENT DOCUMENTS 5,742,810 A * 4/1998 Ng ...................... G06F 16/2443
5,799,310 A * 8/1998 Anderson ............. G06F 16/284
(Continued)

OTHER PUBLICATIONS

United States Final Office Action dated Jul. 12, 2019 for U.S. Appl. No. 15/457,688.

*Primary Examiner* — Duy Khuong T Nguyen
(74) *Attorney, Agent, or Firm* — EIP US LLP

(57) ABSTRACT

A method for generating code for queries in a database system includes obtaining a user query in a first programming language, the user query comprising at least one query parameter for selecting data from a content database. The method includes obtaining machine code corresponding to a compiled version of the user query. Obtaining the machine code includes generating code in a second programming language corresponding to a compiled version of the user query, generating byte code defining a plurality of functions corresponding to a compiled version of the code in the second programming language, and obtaining the machine code corresponding to the compiled version of the user query based on the byte code. The method further comprises executing the machine code using the at least one query parameter, thereby returning a result satisfying the at least one query parameter. A related non-transitory computer-readable medium and system are also provided.

12 Claims, 12 Drawing Sheets

(56) References Cited

U.S. PATENT DOCUMENTS

| | | | | |
|---|---|---|---|---|
| 5,875,334 | A * | 2/1999 | Chow | G06F 8/427 |
| | | | | 717/141 |
| 6,978,261 | B2 * | 12/2005 | Cotner | G06F 16/2443 |
| 6,985,904 | B1 * | 1/2006 | Kaluskar | G06F 16/24539 |
| 7,933,916 | B2 * | 4/2011 | Dolin | G06F 16/2452 |
| | | | | 707/760 |
| 8,713,049 | B2 * | 4/2014 | Jain | G06F 16/24524 |
| | | | | 707/779 |
| 9,836,507 | B2 * | 12/2017 | Hu | G06F 16/24544 |
| 10,048,952 | B2 * | 8/2018 | Roytman | G06F 9/4552 |
| 2001/0011371 | A1 * | 8/2001 | Tang | G06F 8/41 |
| | | | | 717/160 |
| 2004/0193575 | A1 * | 9/2004 | Chen | G06F 16/289 |
| 2006/0200486 | A1 * | 9/2006 | Castro | G06F 16/2291 |
| 2008/0022265 | A1 * | 1/2008 | Morris | G06F 8/41 |
| | | | | 717/140 |
| 2008/0134207 | A1 * | 6/2008 | Chamieh | G06F 11/3419 |
| | | | | 719/315 |
| 2009/0083219 | A1 * | 3/2009 | Zane | G06F 8/30 |
| 2013/0031139 | A1 * | 1/2013 | Chen | G06F 16/2443 |
| | | | | 707/802 |
| 2013/0198166 | A1 * | 8/2013 | Prout | G06F 16/24524 |
| | | | | 707/718 |
| 2014/0280030 | A1 | 9/2014 | Freedman et al. | |
| 2016/0335062 | A1 | 11/2016 | Teodorescu et al. | |
| 2017/0083604 | A1 * | 3/2017 | Syed-Ebrahim | G06F 21/6227 |

* cited by examiner

400

| SQL QUERY | SKELETAL QUERY FORM (PARAMETERIZED SQL) | |
|---|---|---|
| 410 — Select * from stock where id in(1,2,4) | Select * from stock where id in (<@>) | 415a |
| | Select * from stock where <C> in (<@>) | 415b |
| | Select * from <T> where <C> in (<@>) | 415c |
| 420 — Select price from stock where id=5 | Select price from stock where id=<@> | 425a |
| | Select price from stock where id in (<@>) | 425b |
| | Select <C1> from stock where <C2>=<@> | 425c |
| | Select <C1> from <T> where <C2>=<@> | 425d |
| 430 — Select sum(price) from stock where id in(5,6,7) | Select sum(price) from stock where id in(<@>) | 435a |
| | Select sum(<C1>) from stock where <C2> in(<@>) | 435b |
| | Select <F>(<C1>) from stock where <C2> in(<@>) | 435c |
| | Select price from stock where id in(<@>) AS List; SUM (List) | 435d |

| skeletal query | | LOCATION |
|---|---|---|
| S1 KEY | S1 QUERY FORM | SC17 |
| S2 KEY | S2 QUERY FORM | SC23 |
| S3 KEY | S3 QUERY FORM | SS5 |
| 512 ⋮ | 514 ⋮ | 516 ⋮ |
| Sn KEY | Sn QUERY FORM | SXx |

510 = skeletal query column; 520 = LOCATION

```
Function 5 <100000:ScanTable0>:

Locals:
    local  rvToReturn: offset=0   size=8   align=8   type=int64_t
    local  rvToReceive: offset=16  size=16  align=16  type=uint128_t
    param  hiddenRvParam: offset=32  size=8   align=8   type=bool*
    param         exprs: offset=40  size=8   align=8
       type={ state1: { VersionedNode: { vnHeader: VersionedNode,
             links: { 1 * LockFreeSListNodeGeneric } },
             i: { value: int32_t,  opt: Opt pack(4) },  : int64_t }* }*
    ...

0x0000   DerefN              local=&xact_1   local=&xact   i32=8
  0x0010   Literal8            local=&local_1  i64=0
  0x0020   VSIterInit          local=&iter_1   i32=0   i32=0   i32=0   local=xact_1
                                 i32=0   local=local_1
                                 i32=0   local=local_1
  0x0040   VSIterHasMore       local=&local_2  local=&iter_1   target=0x0204
  0x0050   JumpIfFalse         local=local_2   target=0x01c4
  0x005c   GetQueryContext     local=&xact_2
  0x0064   VSIterGetRowPtr     local=&rowPtr_1  local=&iter_1
  0x0070   Lea                 local=&local_3  local=exprs   i32=0
  0x0080   AssignN             local=local_3   local=&rowPtr_1   i32=8
  0x0090   Lea                 local=&local_9  local=exprs   i32=0
  0x00a0   DerefN              local=&local_8  local=local_9   i32=8
  0x00b0   Lea                 local=&local_7  local=local_8   i32=32
  0x00c0   GetIntNull          local=&local_6  local=local_7
  0x00cc   ParamSigned         local=&local_10 i64=0
  0x00dc   EqSignedSigned      local=&local_5  local=&local_6  local=&local_10
  0x00ec   TFN2Bool            local=&andValue_i  local=&local_5
  0x00f8   Copy1               local=&orValue_1   local=andValue_1
  0x0104   Copy1               local=&local_4  local=orValue_1
  0x0110   JumpIfFalse         local=local_4   target=0x017c
  0x011c   CallManaged         func=1 <100000:NetworkProcessFn0> target=0x01fc
                                 local=&local_11  local=exprs
                                 local=&local_11  local=exprs   local=context
    ...
```

| MBC FUNCTION | | LOCATION |
|---|---|---|
| M1 KEY | M1 FUNCTION FORM | M17 |
| M2 KEY | M2 FUNCTION FORM | M23 |
| M3 KEY | M3 FUNCTION FORM | M4 |
| 812 ⋮ | 814 ⋮ | 816 ⋮ |
| Mn KEY | Mn FUNCTION FORM | Mx |

```
define linkonce_odr i64 @"100000:ScanTable0"(i8* nocapture, %exprs_t1* nocapture,
%context_t1*, %class.Transaction*, i8* nocapture readnone) #7 !dbg !13 {
EntryBlock:
  %local_3.i = alloca %struct.OptSigned, align 8
  %iter_1 = alloca %class.VSLIterator, align 8
  %9 = bitcast %class.VSLIterator* %iter_1 to i8*, !dbg !18
  call void @llvm.lifetime.start(i64 160, i8* %9), !dbg !18
  call void @opVSIterInit(%class.VSLIterator* nonnull %iter_1, i32 0, i32 0, i32
0, %class.Transaction* %3, i32 0, i64 0), !dbg !18
  %6 = getelementptr inbounds %class.VSLIterator, %class.VSLIterator* %iter_1, i64
0, i32 0, i32 0, i32 6, i32 0, i32 0, !dbg !18
  %7 = load %class.RefCounted*, %class.RefCounted** %6, align 8, !dbg !18
  %8 = icmp eq %class.RefCounted* %7, null, !dbg !18
  br i1 %8, label %opVSIterHasMore.exit2, label %.critedge7, !dbg !18
```

FIG. 9

CODE GENERATION FOR QUERIES IN A DATABASE SYSTEM

CROSS-REFERENCE TO RELATED APPLICATIONS

This application is a continuation of U.S. patent application Ser. No. 15/457,688, filed Mar. 13, 2017, the contents of which are hereby incorporated by reference herein in their entirety.

BACKGROUND

Field of the Disclosure

The present application relates to database searching and, more specifically, methods and systems for increasing the efficiency of search queries in database systems.

Description of the Related Technology

As technologies advance, the amount of information stored in electronic form and the desire for real-time or pseudo real-time ability to search such information is ever increasing. Database management systems are designed to organize data in a form that facilitates efficient search and retrieval of select information. Typical database management systems allow a user to submit a "query" in a query language for retrieving information that satisfies particular search parameters. Often, the user's query is a sequence of queries that are sequentially applied, with each query providing an increasingly finer filter for retrieving the desired information.

In a typical database management system, a query language interpreter compiles a given query into a computer executable code, executes the code, then proceeds to compile the next query. Such transformation of query language into machine code that is directly executable on a processing system typically consumes a significant amount of computational time. Moreover, because most queries are unique, in that they are typically generated to solve a particular problem, for example to locate a particular information item, or to create a particular grouping of information, each query is generally compiled and interpreted independently of prior queries. The cumulative effect of having to regenerate the executable code for each query may be substantial, resulting in poor performance for all users, as the system spends more time regenerating code than in actually executing the code to satisfy each query. Accordingly, it would be advantageous to reduce the time required to return results of user queries against database management systems.

SUMMARY

A method includes obtaining a user query in a first programming language, the user query comprising at least one query parameter for selecting data from a content database. The method includes obtaining machine code that is executable directly by a processing system, corresponding to a compiled version of the user query. Obtaining the machine code includes generating code in a second programming language corresponding to a compiled version of the user query, generating byte code defining a plurality of functions corresponding to a compiled version of the code in the second programming language, and obtaining the machine code corresponding to the compiled version of the user query based on the byte code. The method includes executing the machine code corresponding to the compiled version of the user query using the at least one query parameter, thereby returning a result of the user query satisfying the at least one query parameter.

A non-transitory computer readable medium comprising instructions which, when executed by a processing system, causes the processing system to obtain a user query in a first programming language, the user query comprising at least one query parameter for selecting data from a content database. The instructions, when executed, further cause the processing system to obtain machine code that is executable directly by a processing system, corresponding to a compiled version of the user query. Obtaining the machine code includes generating code in a second programming language corresponding to a compiled version of the user query, generating byte code defining a plurality of functions corresponding to a compiled version of the code in the second programming language, and obtaining the machine code corresponding to the compiled version of the user query based on the byte code. The instructions, when executed, further cause the processing system to execute the machine code corresponding to the compiled version of the user query using the at least one query parameter, thereby returning a result of the user query satisfying the at least one query parameter.

A system comprises a code database, a content database, and a processing system. The processing system is configured to obtain a user query in a first programming language. The user query comprises at least one query parameter for selecting data from a content database. The processing system is configured to obtain machine code that is executable directly by a processing system, corresponding to a compiled version of the user query. Obtaining the machine code includes generating code in a second programming language corresponding to a compiled version of the user query, generating byte code defining a plurality of functions corresponding to a compiled version of the code in the second programming language, and obtaining the machine code corresponding to the compiled version of the user query based on the byte code. The processing system is configured to execute the machine code corresponding to the compiled version of the user query using the at least one query parameter, thereby returning a result of the user query satisfying the at least one query parameter.

BRIEF DESCRIPTION OF THE DRAWINGS

FIG. 4 illustrates an example set of search queries and corresponding parameterized skeletal queries, in accordance with some embodiments;

FIG. 5 illustrates an example data structure for identifying the location of previously compiled skeletal queries corresponding to identified skeletal query forms, in accordance with some embodiments;

FIG. 7 illustrates an excerpt of MemSQL Byte Code (MBC), in accordance with some embodiments;

FIG. 8 illustrates an example data structure for identifying the location of previously compiled intermediate byte code, e.g., MBC, in accordance with some embodiments;

FIG. 9 illustrates an excerpt of Low Level Virtual Machine (LLVM) bit code, in accordance with some embodiments;

DETAILED DESCRIPTION

Figure 1:
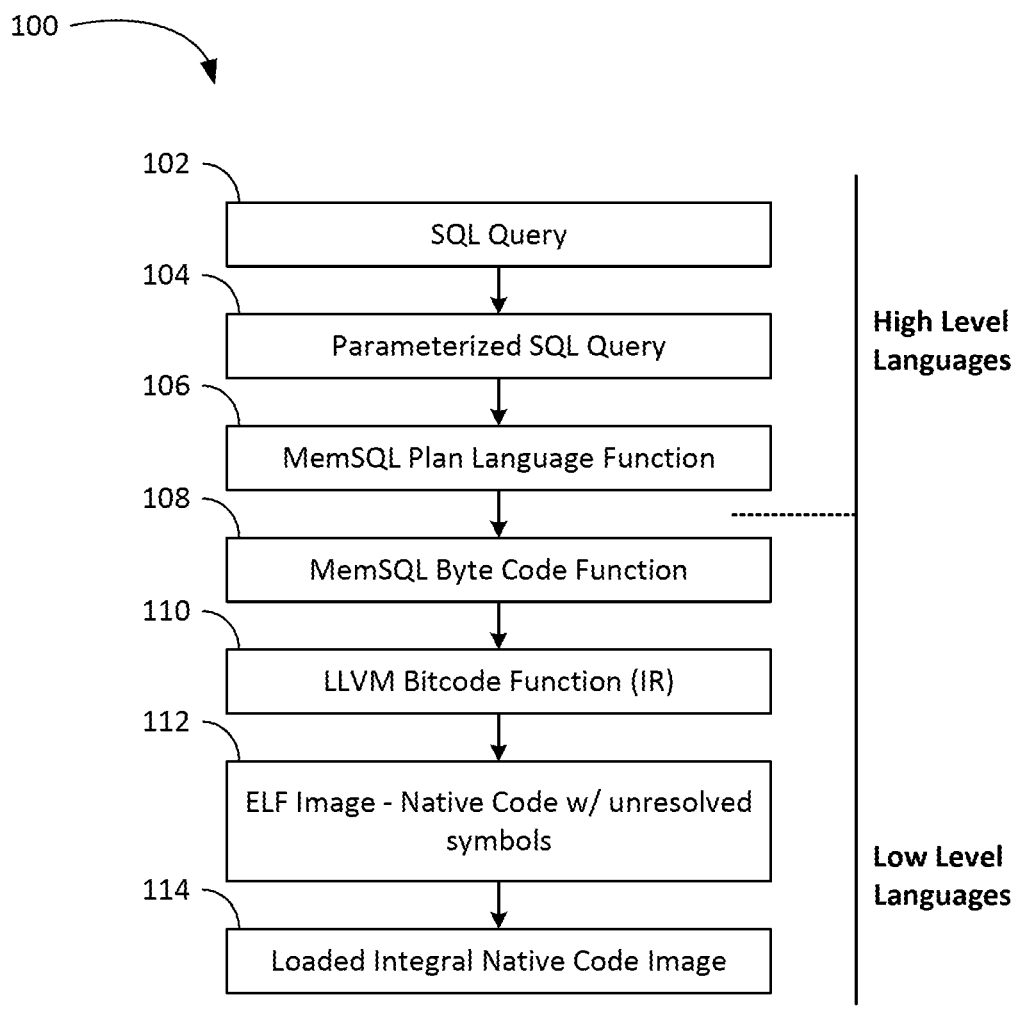
FIG. 1 illustrates a flowchart of general sequential transformations of a search query made to a content database, in accordance with some embodiments.

In the following description, for purposes of explanation rather than limitation, specific details are set forth such as the particular architecture, interfaces, techniques, etc., in order to provide a thorough understanding of the concepts described herein. However, it will be apparent to those skilled in the art that the other embodiments may be practiced, which depart from these specific details. Similarly, the present application is directed to example embodiments as illustrated in the FIGs., and is not intended to limit any claimed invention beyond the terms expressly included in the claims. For purposes of simplicity and clarity, detailed descriptions of well-known devices and methods are omitted so as not to obscure the description with unnecessary detail. However, the lack of any description for any particular device or method does not necessarily indicate that it or its function are well-known.

The FIGs. describe example query processing systems using the paradigm of a database query system that processes queries formed using the operations and format of the standard Structured Query Language (SQL). One of skill in the art will recognize, however, that the principles described herein may be applied for the processing of queries in other programming languages as well.

As noted above, in a common database query language, there are perhaps thousands of different forms of queries that may be submitted by a user. Conventional query language interpreters are configured to parse each query into a series of more primitive operations. However, any particular user of the query language is likely to use a limited subset of query forms, and as such, may often repetitively use the same form of a query, albeit with different query parameters, or may apply the same query to different databases. Similarly, different users in the same organization, or different users of the same database, may use the same query forms, albeit with different query parameters.

In the following FIGs. various queries, compiled functions, and code are described as comprising high-level programming languages and/or low-level programming languages. For the purpose of definition, a high-level programming language is amenable to the way people think and read, and to how programmers program. Such tasks as memory management (e.g., freeing, deleting, or creating objects and memory) are generally automatically managed in the background and generally do not require explicit definition in the high-level code itself. Thus, for high-level programming languages, many variables and conditions are implied. For example, the use of IF/THEN/ELSE, FOR, or WHILE statements, may be called in high-level languages and the control flow, or specific steps involved in carrying out such recursive algorithms, are handled automatically without being explicitly defined in the code statement itself. Thus, high-level programming languages are generally easier to program in, since there are far fewer variables and states that must be explicitly defined, tracked and accounted for, and because the code more closely resembles spoken language.

On the other hand, low-level programming languages are not as easy to maintain and program in comparison to high-level programming languages at least because they generally do not self-manage memory or control flow. Far fewer variables and states are implied, meaning they have to be explicitly defined, tracked and accounted for. For example, compound statements such as IF/THEN/ELSE, FOR, or WHILE statements are not directly supported. Instead low-level programming languages generally progress sequentially from line to line, executing conditional or non-conditional commands, unless a jump command or a return command, for example, instructs the processor to jump from a particular line of code to some other non-sequential line of code. Moreover, the lowest low-level programming languages, for example, native or machine code or low level virtual machine bitcode, generally define registers rather than variables and, in some cases, may operate on memory directly.

The term compile may indicate generating code in a lower-level programming language than the programming language on which that generated code is based, while the term decompile may indicate the reverse operation. The term transpile may indicate generating code in a programming language having a level similar to a level of the code from which the generated code is based.

Moreover, in the past, an old compiler's adage, that you could choose any two of fast execution time, fast compile time, and short software development time but not all three, was considered a general rule. However, based on the below description, the inventors have provided embodiments that provide for all three simultaneously.

FIG. 1 illustrates a flowchart 100 of general sequential transformations of a search query made to a content database, in accordance with some embodiments. Transformations and/or compilations will be described briefly in connection with FIG. 1, but may be discussed in more detail in connection with one or more of the following FIGs.

Flowchart 100 begins with a SQL query 102. However, SQL query 102 could also be submitted in a programming language other than SQL. SQL query 102 is converted, or transpiled, to a parameterized SQL query 104, which comprises a form of the query, hereinafter termed the "skeletal" form of the query, and placeholders for the particular parameters associated with the query. Parameterizing and identification of a skeletal query form will be described in more detail in connection with at least FIGS. 2, 4 and 5.

Parameterized SQL query 104 may be compiled into one or more MemSQL plan language (MPL) functions 106 corresponding to and configured to provide the intended result of parameterized SQL query 104. MPL is a new, simple, tightly managed high-level programming language designed specifically for MemSQL, which is a customdesigned structured query language, rather than for general purpose applications. In such a compilation from SQL query to MPL, fast compile times may be achieved since SQL operator trees are converted directly to MPL abstract syntax trees, eliminating the need for computationally expensive parsing and semantic resolution at query compilation time, which decreases compiling time for a query. In addition, because MPL is a high-level programming language, it is more efficient to program and work in for the vast majority of human programmers, further providing short software development times. For example, being a high-level programming language, MPL does not require explicit definition of, e.g., create and/or destroy functions for particular objects or memory allocations, thereby automating control flow and memory management processes and reducing programming costs and the frequency of programming errors and/or mistakes. In some other embodiments, parameterized SQL query 104 could be compiled into a high-level programming language other than MPL without diverging from the scope of the present application.

MPL function(s) 106 may then be compiled into one or more corresponding MemSQL Byte Code (MBC) functions 108. MBC, as a byte code or interpreted code, is a compact, low-level programming language that can easily be serialized, interpreted or transformed to low level virtual machine (LLVM) bit code. Interpreting MBC directly nearly eliminates the first-time computational cost of running a query, thereby offering a substantial decrease in required compilation time and increasing the speed at which a solution may be returned for any particular query that must first be compiled.

MBC functions 108 may then be compiled into LLVM bit code functions 110. LLVM bit code functions 110 may be considered an intermediate representation of MBC functions 106 configured to run on a low-level virtual machine. The use of LLVM allows programmers to program on the backbone of well-established virtual machine constructions, code bases and handlers, thereby leveraging previous programming in the compiler space.

LLVM bit code functions 110 may then be compiled into an executable and linkable format (ELF) image comprising native code, also known as machine code, and at least one unresolved symbol. Of course, embodiments where no unresolved symbols are included in the compiled ELF image are also contemplated. Native or machine code may be very low level code that is executable directly on a processing system, for example, on one or more processors. The unresolved symbols may be symbols that do not have intrinsically defined meanings in native or machine code but, instead, indicate memory addresses where additional native or machine code associated with one or more functions is currently stored. By including the one or more unresolved symbols in the ELF image, essentially as a form of shorthand, the additional stored native or machine code need not be transcribed inline in the compiled ELF image, thereby providing a new way in which to reduce computational resources and the associated execution time during compilation of a query.

ELF image 112 may then be loaded for direct execution by one or more processors in the form of a loaded integral native or machine code image 114. For example, the one or more unresolved symbols may be replaced with the memory address to which it corresponds such that during execution of loaded integral native or machine code image 114, a processor will step through the ELF image machine code sequentially and, when the memory address is reached, jump to that memory address and read the additional native or machine code directly from that memory address. The process briefly and generally described in connection with FIG. 1 will now be described in more detail in connection with FIG. 2 below.

Figure 2:
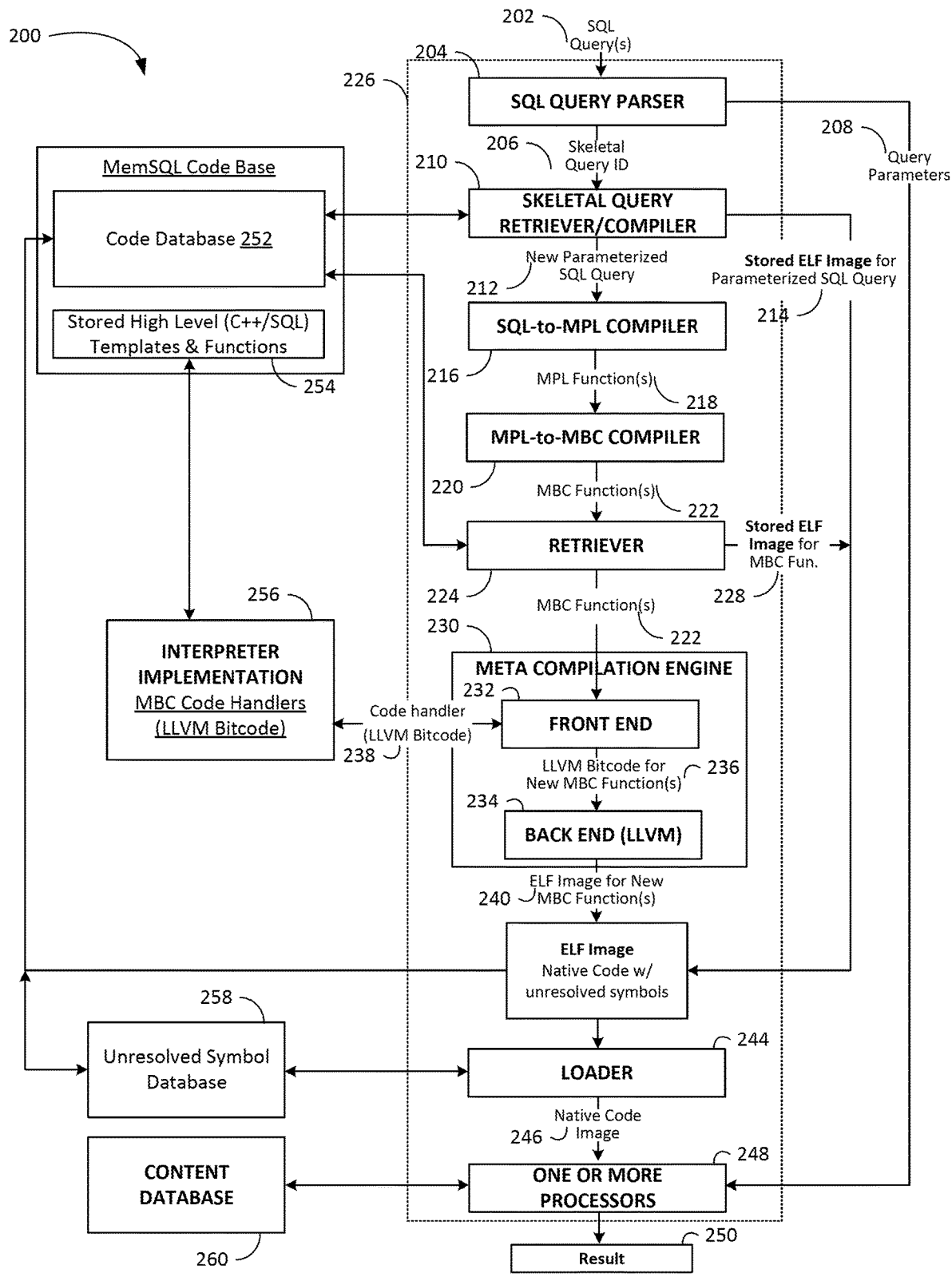
FIG. 2 illustrates a block diagram of the flow a processing system may traverse when executing a search query made to a content database, in accordance with some embodiments.

FIG. 2 illustrates a block diagram 200 of the flow a processing system 226 may traverse when executing a search query made to a content database 260, in accordance with some embodiments. Processing system 226 may include or be configured to run a MemSQL binary (e.g., compiled machine code) file, which may have been precompiled and shipped to or downloaded from a database by a client, which supports or executes the functions described below in connection with FIG. 2. In some embodiments, such databases may a part of a network of servers configured to upload, store, and provide for download of software, sometimes referred to as the "cloud". For example, such cloud embodiments may include private clouds where the servers are either retained or maintained for a single company, a cluster cloud where a plurality of servers are maintained by a third-party cloud service (e.g., Amazon®, Azure®, Google®, etc.), or even on-premises where one or more software, code or programs are stored locally on a server, storage or memory of the client running the software, code or programs. Thus, the processes described in the present application may correspond to implementations of software as a service (SaaS).

A SQL query 202 is submitted by a user or other entity and parsed by a SQL query parser 204 to identify the skeletal query form of SQL query 202 and one or more query parameters 208 associated with SQL query 202. SQL query parser 204 passes a skeletal query identifier (ID) 206 to a skeletal query retriever/compiler 210.

With respect to parameterized SQL queries and their associated skeletal query forms, consider, for example, two queries, such as "Select all records in tableA, with name equal to 'smith', 'jones', or 'brown'", and "Select all records in tableA, with name equal to 'adams', 'nagle', 'harris', or 'kelly'". In SQL query parser 204, each of these queries would likely invoke the same set of computer instructions, with the exception that in the first query, a search will be conducted for each of the three match values of 'smith', 'jones', or 'brown', and in the second query, a search will be conducted for each of the four match values of 'adams', 'nagle', 'harris', or 'kelly'.

In some embodiments, a skeletal form of this query may be of the form "Select all record in tableA, with name equal to one of <list>". When a compiled version of this skeletal query is created, it may be created in a parameterized form, wherein the particular list of match values is encoded as an argument to the compiled query. The particular list of match values is provided to the compiled query when the compiled query is invoked ("called"). In like manner, a skeletal form of this query may also include the identifier of the column as an argument, such as "Select all record in tableA, with <column> equal to one of <list>". Skeletal forms of SQL queries are discussed further in connection with FIGS. 4 and 5 below.

Skeletal query retriever/compiler 210 then determines if an ELF image corresponding to the skeletal query ID is stored, e.g., available, in a code database 252 and, if so, retrieves the corresponding ELF image 214 from code database 252 and passes it to a loader 244. As shown in FIG. 2, a compiled skeletal query may include an ELF image comprising native or machine code and, in some embodiments, at least one unresolved symbol as previously described. Thus, if an ELF image corresponding to the skeletal Query ID has been previously stored, the query may not require recompiling to native or machine code, bypassing the associated time consuming compilation.

Although creating a compiled version of a single skeletal query may be more time and resource consuming than the conventional interpretation and decomposition of a query into a series of primitive operations, the potential savings in execution time using a compiled version of a query, and particularly, the potential savings in interpretation and execution time and resources when a compiled version is re-used, will generally provide for a substantial improvement in the overall execution of the user's queries.

It should be recognized that providing compiled versions of a query does not exclude the conventional use of un-compiled queries. If a particular query is deemed unsuitable for compilation, due to the complexity or uniqueness of the query, or a recognition that the conventional processing of this un-compiled query is sufficiently efficient, or other factors, the creation of a compiled version of the query may be bypassed (not shown in FIG. 2).

If an ELF image corresponding to skeletal query ID 206 is not stored, e.g., available, in code database 252, skeletal query retriever/compiler 210 passes a new parameterized SQL query 212 (i.e. the skeletal query and/or its new skeletal query ID) to a SQL-to-MPL compiler 216, which generates, e.g., compiles, at least one MPL function 218 corresponding to new parameterized SQL query 212. As previously described, the use of MPL as an intermediate compiling iteration provides new benefits to the field of database queries, especially in-memory database queries, specifically, at least partly optimized compiling from MemSQL query language to MPL and short programming times at least by virtue of MPL being a high-level language that is easy for programmers to code in. SQL-to-MPL compiler 216 passes MPL function(s) 218 to an MPL-to-MBC compiler 220, which generates, e.g., compiles, at least one MBC function 222 corresponding to MPL function(s) 218.

In some embodiments, MPL-to-MBC compiler 220 passes MBC function(s) 222 to a retriever 224, which determines if native or machine code (e.g., an ELF image) 228 corresponding to the particular MBC function(s) 222 is stored, e.g., available, in code database 252 and, if so, retrieves the previously stored ELF image 228 from code database 252 and passes it to loader 244. If such a corresponding ELF image 228 has been previously stored, MBC function(s) 222 may not require recompiling to native or machine code, bypassing time consuming compilation. Accordingly, the process of storing machine code compiled based on particular MBC functions for subsequent retrieval provides a new way to reduce both compilation time and execution time for queries by allowing bypass of compilation of any previously stored MBC function.

As shown in FIG. 2, ELF image 228 comprises native or machine code and, in some embodiments, at least one unresolved symbol as previously described. A check whether native or machine code has been previously stored may be made at the level of MBC, but generally not at the level of MPL, because the MBC functions, being a low-level language, will generally have explicitly defined the memory addresses of tables, variables, etc., and so such variables are explicitly accounted for. By contrast, MPL, being a high-level language, may not explicitly define such memory addresses, and so such variables are not explicitly accounted for. Thus, a search for matching MPL code is not generally guaranteed a one-to-one mapping to particular native or machine code, whereas a search for matching MBC code generally would be.

If such a corresponding ELF image 228 is not stored, e.g., available, in code database 252, retriever 224 may pass the MBC function(s) 222 to a meta compilation engine 230 for compilation. In embodiments omitting retriever 224, where MBC functions are not checked against previously stored ELF compilations, MPL-to-MBC compiler 220 may directly pass MBC function(s) 222 to meta compilation engine 230.

Meta compilation engine 230 may comprise a front end 232, which may also be known to those of skill in the art as a "Clang" front end, or "CFE", and a back end 234. An MBC program comprising MBC function(s) 222 may be passed to front end 232, which is configured to retrieve LLVM bitcode 238 for MBC code handlers from a code database 254 as required, generate, e.g., compile, corresponding LLVM bitcode 236 for or based on MBC function(s) 222, and pass LLVM bitcode 236 to back end 234. Back end 234 is configured to, based on LLVM bitcode 236 corresponding to MBC function(s) 222, generate, e.g., compile, an ELF image 240 comprising native or machine code and one or more unresolved symbols, as previously described, and pass EFL image 240 to loader 244. In some embodiments, ELF image 240 may also be saved to local memory, local storage, server cache, or server storage, for example, to code database 252 for retrieval and use for a subsequent matching query. This persisting of ELF image 240 to storage or cache provides a new benefit in addition to the time savings of retrieval over recompilation. If power is lost, all code and information is self-contained in the ELF and, therefore, problems associated with locations of objects, registers, etc. being in a different location than their last volatile memory location may be substantially eliminated, further improving query execution timescales. In addition, to further reduce query compilation time, MBC code handlers, which tell the meta compilation engine 230 how to compile MBC to LLVM bitcode may be compiled to LLVM bitcode 238 offline, in advance, and may be shipped to or downloaded from a database, for example the cloud, by the client in a pre-compiled format, for example as an interp_ops.bc file, even though the actual MBC functions themselves may be compiled in the client's machine if not previously compiled and saved on a per query basis. Thus, time is saved from not having to compile the MBC code handlers before in-taking them by meta compilation engine 230. Such a pre-compiled format may be made available in connection with software as a service (SaaS).the MemSQL binary file (the machine code file that runs this entire process) is precompiled and sent to the client.

Loader 244 may retrieve a memory address at which additional native or machine code corresponding to each unresolved symbol included in ELF image 214, 228, 240 is located and replace each unresolved symbol with the respective memory address. For such operations, loader 244 may include RuntimeDyld logic, which is a library for loading ELF images, that executes or supports the retrieving the memory addresses and replacing the unresolved symbols therewith. In some embodiments, loader 244 may comprise a wrapper for the RuntimeDyld logic. Accordingly, the inclusion of the unresolved symbol, and/or that symbol's later replacement by the respective memory address provides a new way in which to reduce compilation and/or execution time, namely elimination of the requirement for transcribing the additional native or machine code associated with the symbol directly into the ELF image. Loader 244 may further output the native or machine code image 246 to one or more processors 248.

One or more processors 248 may then retrieve the at least one query parameter 208 originally parsed by SQL query parser 204, insert the at least one query parameter 208 into native or machine code 246 and execute native or machine code 246, thereby returning a result 250 of the original query satisfying the at least one query parameter 208.

Figure 3:
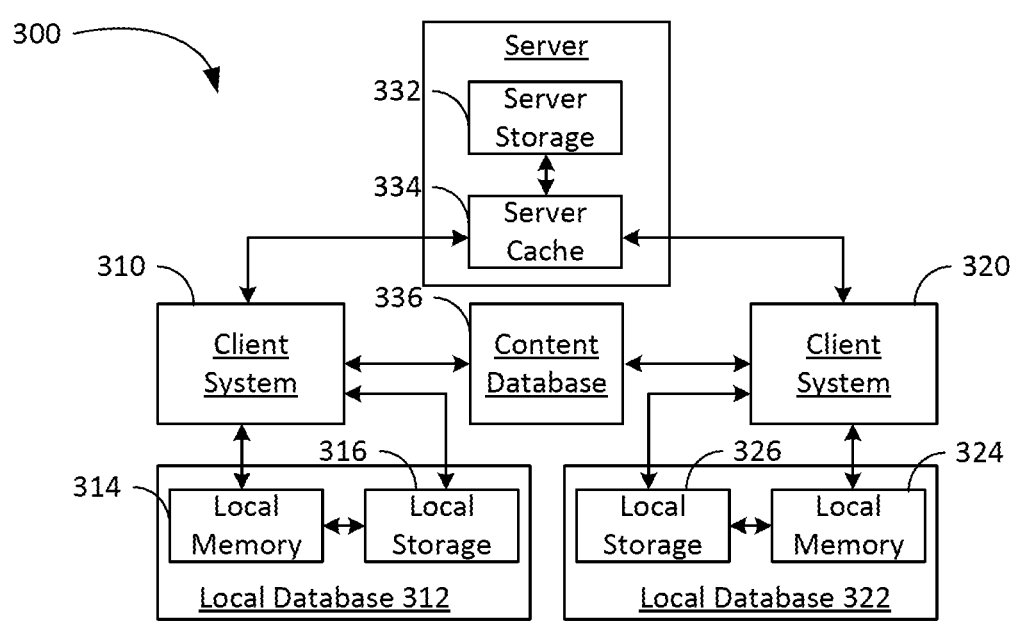
FIG. 3 illustrates a block diagram of a system for carrying out a search query made to a content database, in accordance with some embodiments.

The following description of FIGS. 3-5 has been previously described, at least in part, in U.S. Pat. Nos. 9,135,310 B2, 9,141,678 B2 and 9,317,552 B2, the contents of which are hereby incorporated by reference in their entirety.

FIG. 3 illustrates a block diagram of a system 300 for carrying out a search query made to a content database 336, in accordance with some embodiments. In this example, two client systems 310, 320 communicate with a server cache 334 to obtain compiled skeletal queries, and/or compiled MBC functions, that facilitate querying of content database 336. In some embodiments, each of client systems 310, 320 may comprise at least the features described within processing system 226 of FIG. 2. In some other embodiments, one or more features described within processing system 226 of FIG. 2 may be omitted and/or one or more additional features not described may further be present. One of skill in the art will also recognize that the number of client systems and server caches may differ from this example embodiment, for example, only one client system or any number of client systems greater than two.

Each client 310, 320 includes local storage 316, 326 for persistent storage of previously compiled queries and/or compiled associated MBC functions, and local memory 314, 324 into which these compiled queries may be loaded for execution by client system 310, 320. When client system 310, 320, executes a compiled query, using query parameters specific to the particular query, the content database 336 is accessed and the requested information is provided to the requesting client system 310, 320.

Server cache 334 may be configured to store other compiled skeletal queries and/or compiled MBC functions at server storage 332. For example, as each client 310, 320 creates a new compiled skeletal query and/or compiled associated MBC function, it may forward a copy to server cache 334. Thereafter, each client 310, 320 is able to retrieve and use a compiled skeletal query and/or MBC function that was created by a different client.

Optionally, because server storage 332 may include all of the compiled skeletal queries and/or compiled MBC functions, regardless of origin, the use of local storage 316, 326 at client systems 310, 320 may be optional. That is, some or all of the client systems may rely on retrieving all compiled skeletons and/or compiled MBC functions from server storage 332, via server cache 334, for example.

Also, one of skill in the art will recognize that the use of server cache 334 is also optional, in that client systems 310, 320 may be configured to access server storage 332 directly. Preferably, server cache 334 provides faster access to the compiled skeletons and/or complied MBC functions by keeping recently accessed, or frequently accessed, skeletons and/or MBC functions available at server cache 334, thereby avoiding the need to access server storage 332, which is likely to have slower retrieval times. Accordingly, in some embodiments, any of databases 252, 254, 256, or 256 of FIG. 2. may correspond to or exist integrally in any one of local memories 314, 324, local storages 316, 326, server cache 334, or server storage 332 of FIG. 3, or alternatively in a distributed database across any combination of the same. Similarly, content database 260 of FIG. 2 may correspond to content database 336 of FIG. 3.

FIG. 4 illustrates an example set of search queries and corresponding parameterized skeletal queries, in accordance with some embodiments. The first query 410 is a SQL query that returns all of the records (rows) in the table "stock" that have a value of 1, 2, or 4 in the column "id". This query includes the SQL operational terms of: Select, From, and Where; and has parameters "*" (entire record), "stock", "id", and the match values of 1, 2, and 4.

A variety of skeletal queries 415a-415c, and others, may be defined from the user query 410, depending upon the particular features of the embodiment of SQL query parser 204 (FIG. 2). Some embodiments of SQL query parser 204 may parameterize each of the parameters "stock" (the particular table), "id" (the particular column within the table), and "1, 2, 4" (the particular value to be matched to the value in the identified column of the table).

An embodiment of SQL query parser 204 may be configured to parameterize the values that are to be matched, as illustrated by the example query form 415a. The SQL operational terms "Select", "From", and "Where", and the parameters "*", "stock", and "id" are included as integral parts of the query form 415a, whereas the value parameters "1, 2, and 4" are represented by an argument "<@>". Given a compiled version of query form 415a, the compiled query can be used for any search of the stock table for records having particular id values, by passing the particular match values as arguments of the compiled query. To accommodate different sets of match values, including a different number of values included for matching, the value parameters may be passed to the compiled query as elements of a variable length list.

In some more complex embodiments, SQL query parser 204 may be configured to also include the column to be searched as an argument in the query form, as illustrated by the "<C>" argument in the query form 415b. In further embodiments of SQL query parser 204, the table to be searched may also be passed as an argument in the query form, as illustrated by the "<T>" argument in the query form 415c.

Query 420 includes an additional parameter "price" in the query. In contrast to the "*" parameter in query 410, which returns the entire record for all records that have the specified id value, query 420 will return only the value of the price entry in the record for all records that have the specified id value. Query 420 also includes a single value "5" that is to be matched with the value of id in the stock table.

In some embodiments of SQL query parser 204, this price parameter is included as an integral element in the skeletal query form, as illustrated in query form 425 a. The particular value ("5") of the id parameter that is to be matched is included as an argument ("<@>") to the query form 425a, allowing this compiled query to find the price of any particular id value. FIG. 4 also illustrates alternative skeletal query forms 425b-425d that may be formed to satisfy query 420 in more complex embodiments of the SQL query parser 204.

In like manner, FIG. 4 illustrates alternative query forms 435a-435d that may be formed to satisfy query 430. Of particular note, query 430 includes a function "sum(price)". In the example skeletal forms 430a-430c, this function is considered a parameter of the skeletal query form. Alternatively, recognizing that function operations are often performed after the records are selected, the SQL query parser 204 may be configured to partition a query that includes a function call to provide a result into a sequence of operations, such as an operation (query) that identifies the values that are to be provided to the function, followed by the operation of this function on these values, as illustrated by the example query form 435d. In this example, all of the prices in the table stock having an id matching an entry in the argument list "<@>" are returned in a list named "List", using the "Select . . . AS <name>" option. This returned list is then passed to a "SUM" function that provides a sum of the returned prices in List.

One of skill in the art will recognize that any particular embodiment of SQL query parser 204 of FIG. 2 will parse each user's query so as to produce a particular skeletal query with a potential combination of parameters without arguments and parameters with arguments (parameters that are passed as arguments to the skeletal query). For a user's query to be characterized as corresponding to a previously defined skeletal query, the form of the query must match the skeletal query with the defined operations and parameters without arguments (hereinafter the skeletal query form), and provide parameters that can be passed to the skeletal query as arguments that are consistent with this particular skeletal query form. For example, SQL query parser 204 identifies and generates the skeletal query of 415a that will characterize a subsequent user query of the form "Select * from stock where id in ( . . . )" as a query that corresponds to skeletal query 415a with defined operations "Select", "from", "where" and "in", and parameters without arguments"*", "stock", and "id". The values within the parentheses following the "in" operation are the parameters that are passed as arguments ("<@>") to the compiled skeleton query corresponding to skeletal query 415a.

FIG. 5 illustrates an example data structure 500 for identifying the location of previously compiled skeletal queries corresponding to identified skeletal query forms, in accordance with some embodiments. The data structure 500 may be stored in a server, for example, code database 252 (FIG. 2). In FIG. 5, each compiled skeleton includes a description of the skeletal query 510, and a location 520 at which the compiled skeleton may be found.

When a client submits a compiled skeleton to code database 252, it may include a description of the skeleton (the aforementioned skeletal query form of parameters without arguments) and a description/list of the parameters with arguments, which code database 252 may include as the skeletal query form 514 directly, or after some pre-processing for compatibility among clients. When a client subsequently submits a request for a compiled skeleton having this skeletal query form, code database 252 initiates a search for a matching skeletal query form 514.

To facilitate the search for a matching skeletal query form, code database 252 may use one or more skeleton "keys" 512 that serve to reduce the range of the search or otherwise increase the speed of the search. For example, in some embodiments, the skeletal queries may be ordered based on the order of query commands in the skeleton. Queries starting with "Select" may be grouped together, and within that grouping, are ordered based on the next command or parameter (e.g. "<F>", "*", etc.), with further sub-groups based on the subsequent commands or parameters. Given an ordered list of skeletal query keys 512, conventional search techniques may be applied to quickly determine whether a matching skeleton key 512 and corresponding matching skeleton query form 514 is located in code database 252. If a match is found, the location field 520 identifies where the compiled version of the requested skeletal query form may be found.

Other ordering and search techniques will be apparent to one of skill in the art. For example, the skeletal query key 512 may be a hash value that is created from a hash of the skeletal query form 514, and conventional hash table techniques may be used to determine the location of the complied version of the skeletal query, as detailed above.

The location field 520 may identify a location in a cache of code database 252, if the requested skeletal form has been recently accessed, or is frequently accessed, or a location in storage of code database 252. In some alternative embodiments, a storage location at the client that created the compiled skeleton may be cited for locating the compiled skeleton, reducing or eliminating the need for code database 252 as an external memory structure. That is, instead of submitting the compiled version to code database 252, a client that creates the compiled version may merely submit the skeletal query form 514, and an identification of where the compiled version may be obtained from this client. One of skill in the art will recognize that any of a variety of architectures may be used for dynamically storing and retrieving copies of compiled versions of skeletal queries based on an identification of a corresponding skeletal query form, as detailed herein.

Figure 6:
FIG. 6 illustrates an excerpt of MemSQL Plan Language (MPL) code, in accordance with some embodiments.

FIG. 6 illustrates an excerpt 600 of MemSQL Plan Language (MPL) code, in accordance with some embodiments. Excerpt 600 is a portion of MPL generated for a parameterized, e.g., skeletal, SQL query "select * from t where i=@". As previously discussed, MPL is a high-level programming language. Thus, portions of its syntax are more readable in that they correspond to words of the English language. MPL further supports recursive algorithms, such as the depicted "foreach" and "if" functions. However, in order to provide control flow, memory management, as well as other functions automatically and impliedly handled in the background, MPL code must be compiled to a collection of more primitive operations.

FIG. 7 illustrates an excerpt of MemSQL Byte Code (MBC), in accordance with some embodiments. Excerpt 700 is a portion of MBC generated for a parameterized, e.g., skeletal, SQL query "select * from t where i=@". Excerpt 700 corresponds to MBC generated based on the higher level MPL language excerpt 600 depicted in FIG. 6. As previously discussed, MBC is a low-level programming language. Thus, as depicted, in order to provide control flow, memory management, as well as other functions automatically and impliedly handled in the background by MPL, MBC must explicitly define more variables, e.g., "DerefN", "Literal8", "VSIterInit", "VSIterHasMore", etc. Moreover, MBC includes a greater incidence of code similar to native or machine code, e.g., "0x0000 DerefN", "0x0010 Literal8", etc.

FIG. 8 illustrates an example data structure 800 for identifying the location of previously compiled intermediate byte code, e.g., MBC, in accordance with some embodiments. The data structure 800 may be stored in a server, for example, code database 252 (FIG. 2). In FIG. 8, each compiled byte code includes a description of the byte code 810, and a location 820 at which the compiled byte code may be found.

When a client submits a compiled byte code to code database 252, it may include a description of the byte code and a description/list of the parameters with arguments, which code database 252 may include as the byte code form 814 directly, or after some pre-processing for compatibility among clients. When a client subsequently submits a request for a compiled byte code having this byte code form, code database 252 initiates a search for a matching byte code form 814.

To facilitate the search for a matching byte code form, code database 252 may use one or more byte code "keys" 812 that serve to reduce the range of the search or otherwise increase the speed of the search. For example, in some embodiments, the compiled byte code may be ordered based on the order of commands in the byte code. Given an ordered list of byte code keys 812, conventional search techniques may be applied to quickly determine whether a matching byte code key 812 and corresponding matching byte code query form 814 is located in code database 252. If a match is found, the location field 820 identifies where the compiled version of the requested byte code form may be found.

Other ordering and search techniques will be apparent to one of skill in the art. For example, the byte code key 812 may be a hash value that is created from a hash of the byte code form 814, and conventional hash table techniques may be used to determine the location of the complied version of the byte code, as detailed above.

The location field 820 may identify a location in a cache of code database 252, if the requested byte code form has been recently accessed, or is frequently accessed, or a location in storage of code database 252. In some alternative embodiments, a storage location at the client that created the compiled byte code may be cited for locating the compiled byte code, reducing or eliminating the need for code database 252 as an external memory structure. That is, instead of submitting the compiled version to code database 252, a client that creates the compiled version may merely submit the byte code form 814, and an identification of where the compiled version may be obtained from this client. One of skill in the art will recognize that any of a variety of architectures may be used for dynamically storing and retrieving copies of compiled versions of byte code queries based on an identification of a corresponding byte code form, as detailed herein.

FIG. 9 illustrates an excerpt 900 of Low Level Virtual Machine (LLVM) bit code, in accordance with some embodiments. Excerpt 900 is a portion of LLVM bitcode generated for a parameterized, e.g., skeletal, SQL query "select * from t where i=@". Excerpt 800 corresponds to LLBM bitcode generated based on the MBC language excerpt 700 depicted in FIG. 7, which is based on the MPL language excerpt 600 depicted in FIG. 6. As previously discussed, LLVM bitcode is a low-level programming language. Thus, as depicted, the programming language itself looks even less like the English language, instead relying on syntax, more similar to native or machine code, and that is configured to run on a virtual machine, e.g., "7=load % class.RefCounted*, % class.RefCounted** %6, align 8, !dbg !18".

The following FIGS. 10-14 describe, in more detail, processes that may be followed when returning a result of a query, as previously described in connection with FIG. 2 and in accordance with some embodiments of the present application.

Figure 10:
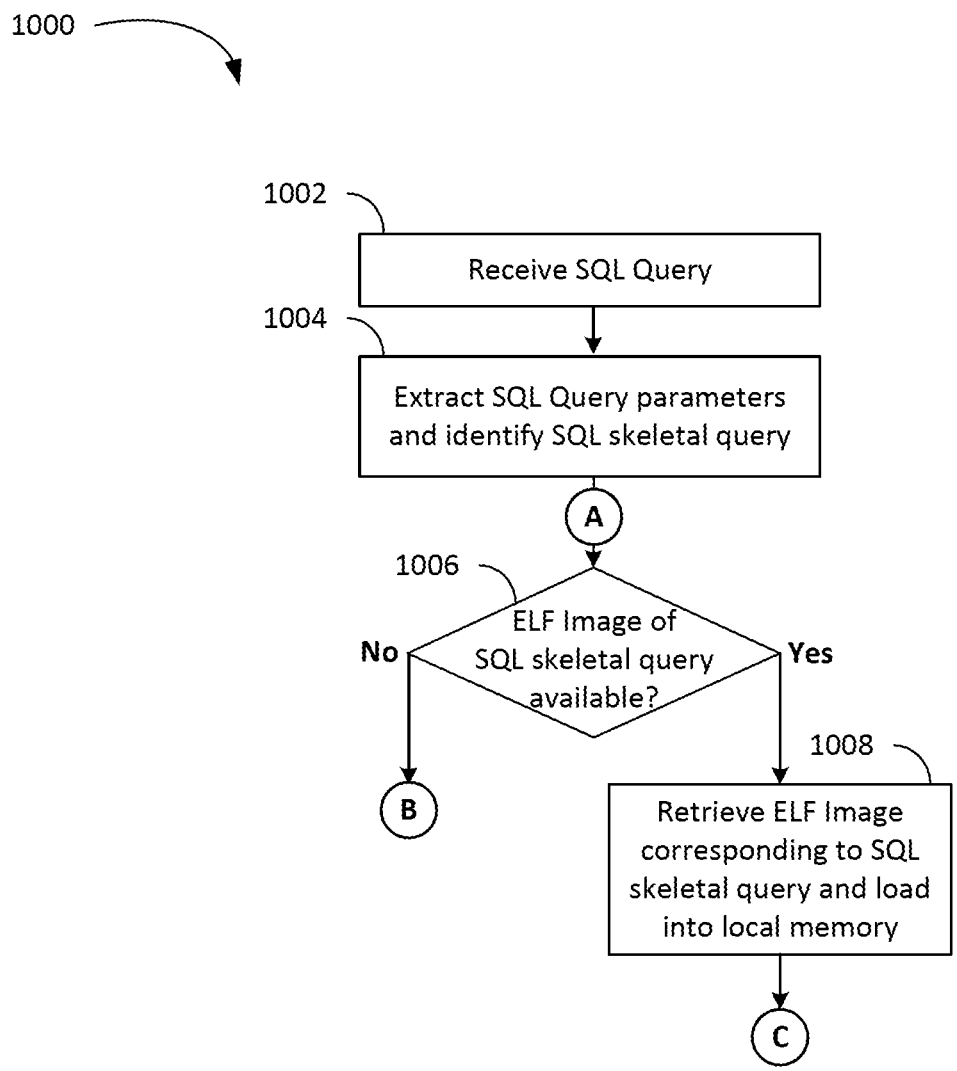
FIG. 10 illustrates a flowchart of a process for determining if a previously compiled skeletal query is available for a particular query, in accordance with some embodiments.

FIG. 10 illustrates a flowchart 1000 of a process for determining if a previously compiled skeletal query is available for a particular query, in accordance with some embodiments.

Flowchart 1000 includes block 1002, which includes receiving a SQL query. For example, as previously described in connection with FIG. 2, SQL query parser 204 may receive SQL query 202.

Flowchart 1000 may advance from block 1002 to block 1004, which includes extracting SQL query parameters and identifying the skeletal query. For example, as previously described in connection with FIG. 2, SQL query parser 204 may be configured to parse query parameters 208 and pass them to loader 244, and parse skeletal query ID 206 and pass it to skeletal query retriever/compiler 210.

Flowchart 1000 may advance from block 1004 to block 1006, which includes determining whether native or machine code (e.g., an ELF image) of the compiled SQL skeletal query is available (e.g., previously stored for subsequent retrieval). For example, as previously described in connection with FIG. 2, Skeletal Query Retriever/Complier 210 may be configured to query code database 252 to see if it contains compiled native code corresponding to the SQL skeletal query. If the determination is NO at block 1006, flowchart 1000 advances to block "B", which is continued in FIG. 12.

If the determination is YES at block 1006, flowchart 1000 advances to block 1008, which includes retrieving the ELF image corresponding to the SQL skeletal query and loading the ELF image into local memory. For example, as previously described in connection with FIG. 2, if native or machine code corresponding to the current SQL query skeleton ID 212 has previously been compiled and stored in code database 252, skeletal query retriever/compiler 210 may retrieve the native or machine code, for example in the form of a stored ELF, and pass it to loader 244. Flowchart 1000 then advances to block "C", which is continued in FIG. 14.

Figure 11:
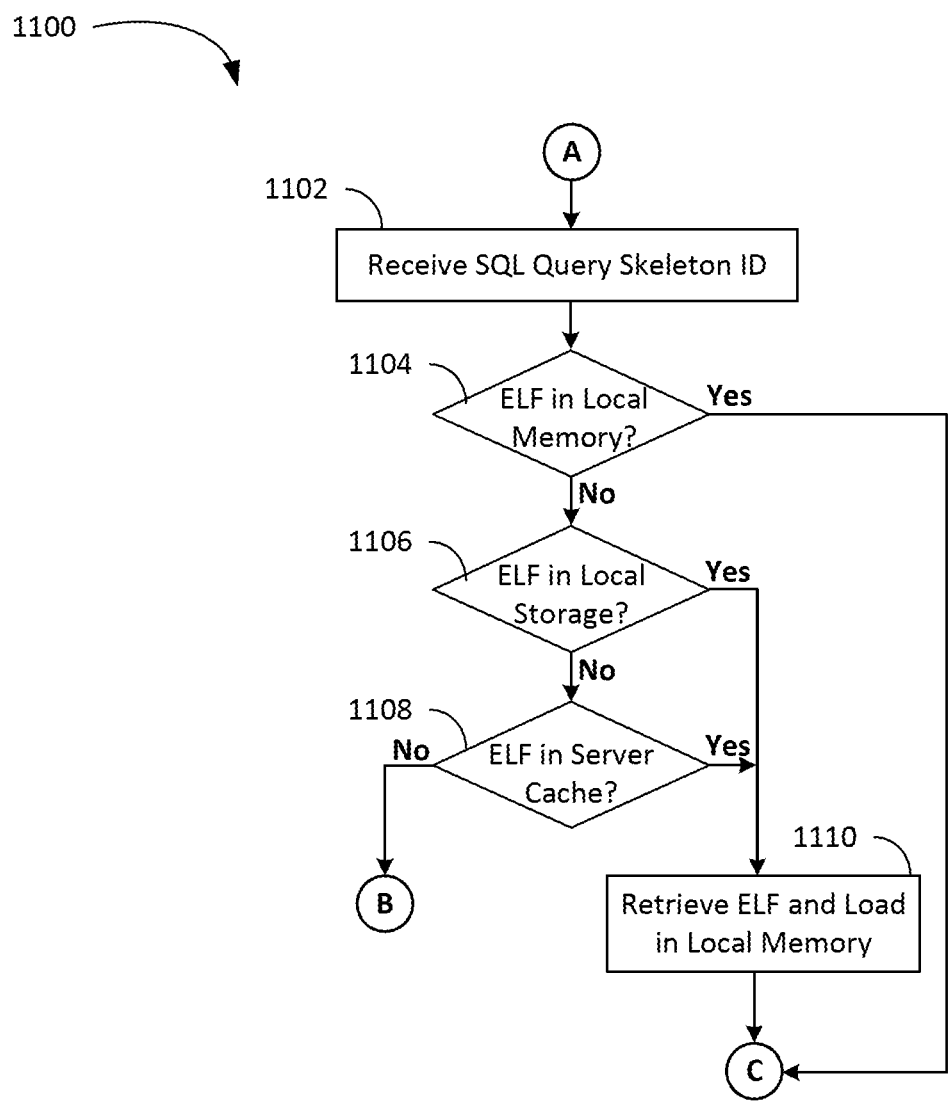
FIG. 11 illustrates a more detailed flowchart of at least a portion of the process of FIG. 10, in accordance with some embodiments.

FIG. 11 illustrates a more detailed flowchart 1100 of at least a portion of the process of FIG. 10, in accordance with some embodiments. For example, the flowchart 1100 illustrates, in more detail, some embodiments of the procedure for at least blocks 1006 and 1008 of FIG. 10. Flowchart 1100 initiates at block "A" from FIG. 10 and advances to block 1102, which includes receiving a SQL query skeleton ID. Such an ID may comprise any indication that serves to positively identify a SQL query skeleton for which a retrieval is attempted. For example, as previously described in connection with FIG. 2, skeletal query retriever/complier 210 may receive skeletal query ID 206.

Flowchart 1100 advance from block 1102 to block 1104, which includes determining whether an ELF image (e.g., native or machine code) is stored in local memory, for example, local memory 314, 324 (FIG. 3). If the determination at block 1104 is YES, flowchart 1100 advances to block "C", which is continued in FIG. 14.

If the determination at block 1104 is NO, flowchart 1100 advances from block 1104 to block 1106, which includes determining whether the ELF image (e.g., native or machine code) is stored in local storage, for example, local storage 316, 326 (FIG. 3). If the determination at block 1106 is YES, flowchart 1100 advances to block 1110.

If the determination at block 1106 is NO, flowchart 1100 advances to block 1108, which includes determining whether the ELF image (e.g., native or machine code) is stored in a server cache, for example, server cache 334 (FIG. 3). If the determination at block 1108 is YES, flowchart 1100 advances to block 1110. If the determination at block 1108 is NO, flowchart 1100 advances to block "B", which is continued in FIG. 12.

As noted above, upon arriving at block 1110 a determination has already been made that a corresponding ELF image is available and is currently being stored in a location other than local memory, e.g., in local storage or in server cache. Block 1110 includes retrieving the ELF image and loading it into local memory. For example, as previously described in connection with FIG. 2, loading ELF image into loader 244. Thus, in flowchart 1100, the corresponding ELF image is either not available in any accessible storage and must be compiled, as will be described in FIG. 14, or is available and was already or is subsequently loaded into local memory where it can be executed.

Figure 12:
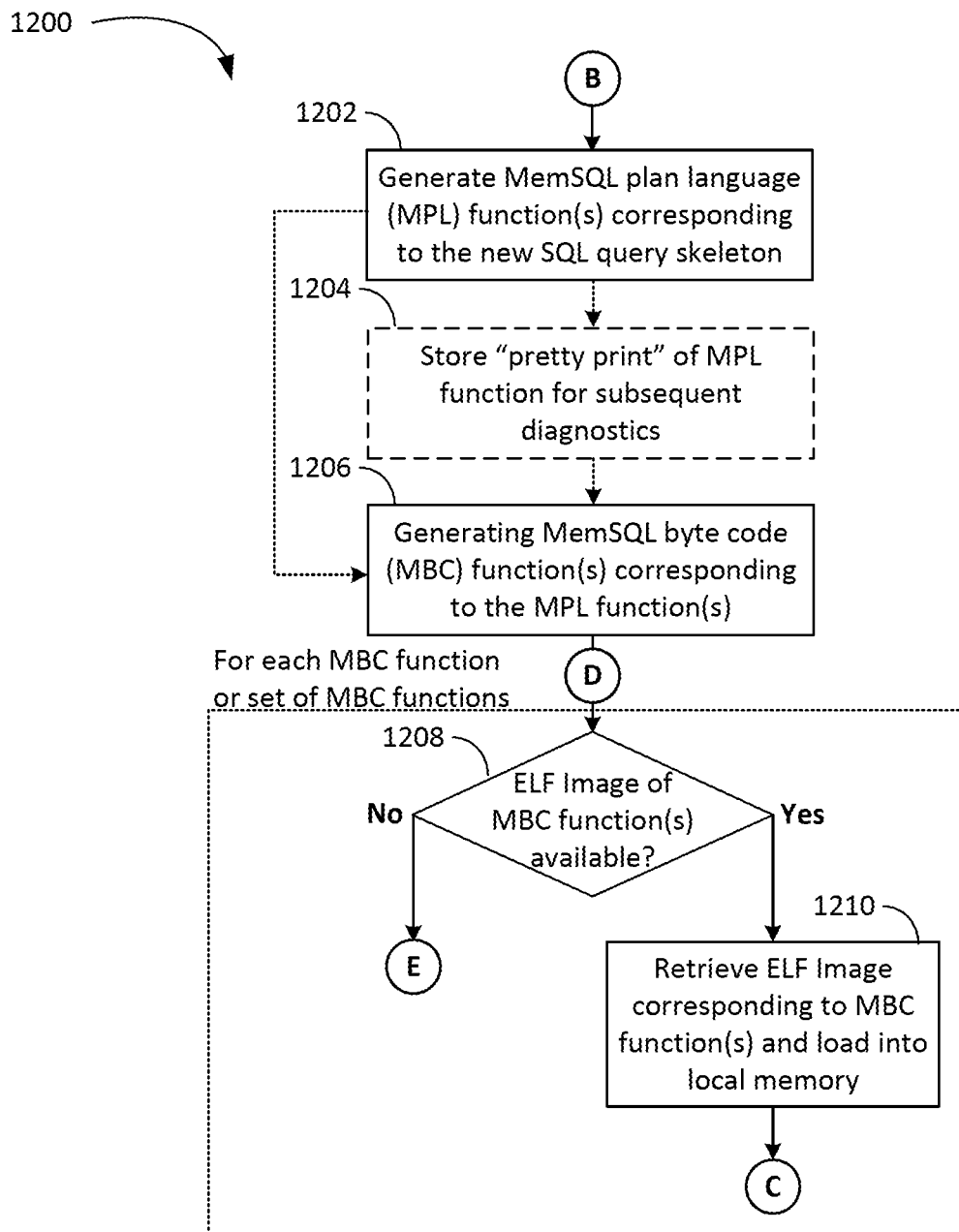
FIG. 12 illustrates a flowchart of a process for compiling a new skeletal search query into an intermediate byte code function and determining if that intermediate byte code function has been previously compiled, in accordance with some embodiments.

FIG. 12 illustrates a flowchart 1200 of a process for compiling a new skeletal search query into an intermediate byte code function and determining if that intermediate byte code function has been previously compiled, in accordance with some embodiments. Flowchart 1200 initiates at block "B" from either of FIG. 10 or 11 and advances to block 1202, which includes generating one or more MPL functions corresponding to the new SQL query skeleton. For example, as previously described in connection with FIG. 2, skeletal query retriever/compiler 210 is configured to pass the new parametrized SQL query skeleton to SQL-to-MPL compiler 216 if a compiled version is not available, and SQL-to-MPL compiler 216 is configured to output the corresponding one or more MPL functions.

In some embodiments, flowchart 1200 advances from block 1202 to block 1204, which includes storing a "pretty print" of the MPL function(s) for subsequent use as a diagnostic for debugging. Pretty print is a format that is easily reviewable by a human programmer and provides an easy reference of what was output in the MPL functions. By providing such a pretty print log, mistakes and errors in the compiling process can be easily identified and debugged, thereby reducing programming time and cost.

In such embodiments, flowchart 1200 advances from block 1204 to block 1206. In other embodiments, where block 1204 is not utilized, block 1202 may advance directly to block 1206, which includes generating one or more MBC function(s) corresponding to the one or more MPL function(s). For example, as previously described in connection with FIG. 2, MPL-to-MBC compiler 220 may be configured to receive the one or more MPL function(s) 218 and generate and output the one or more MBC function(s) 222 that correspond to MPL function(s) 218.

Flowchart 1200 advances from block 1206 to block 1208. Blocks 1208 and 1210 may be carried out for each respective MBC function, or for particular groups of MBC functions, defined by the MBC byte code. Block 1208 includes determining whether native or machine code (e.g., an ELF image) of the compiled MBC function(s) is/are available (e.g., previously stored for subsequent retrieval). For example, as previously described in connection with FIG. 2, retriever 224 may be configured to query code database 252 to see if it contains compiled code corresponding to the MBC function(s). If the determination is NO at block 1208, flowchart 1200 advances to block "E", which is continued in FIG. 14.

If the determination is YES at block 1208, flowchart 1200 advances to block 1210, which includes retrieving the ELF image corresponding to the MBC function(s) and loading the ELF image into local memory. For example, as previously described in connection with FIG. 2, if native or machine code corresponding to the current MBC function(s) has previously been compiled and stored in code database 252, retriever 224 may retrieve the native or machine code, for example in the form of a stored ELF, and pass it to loader 244. Flowchart 1200 then advances to block "C", which is continued in FIG. 14.

Figure 13:
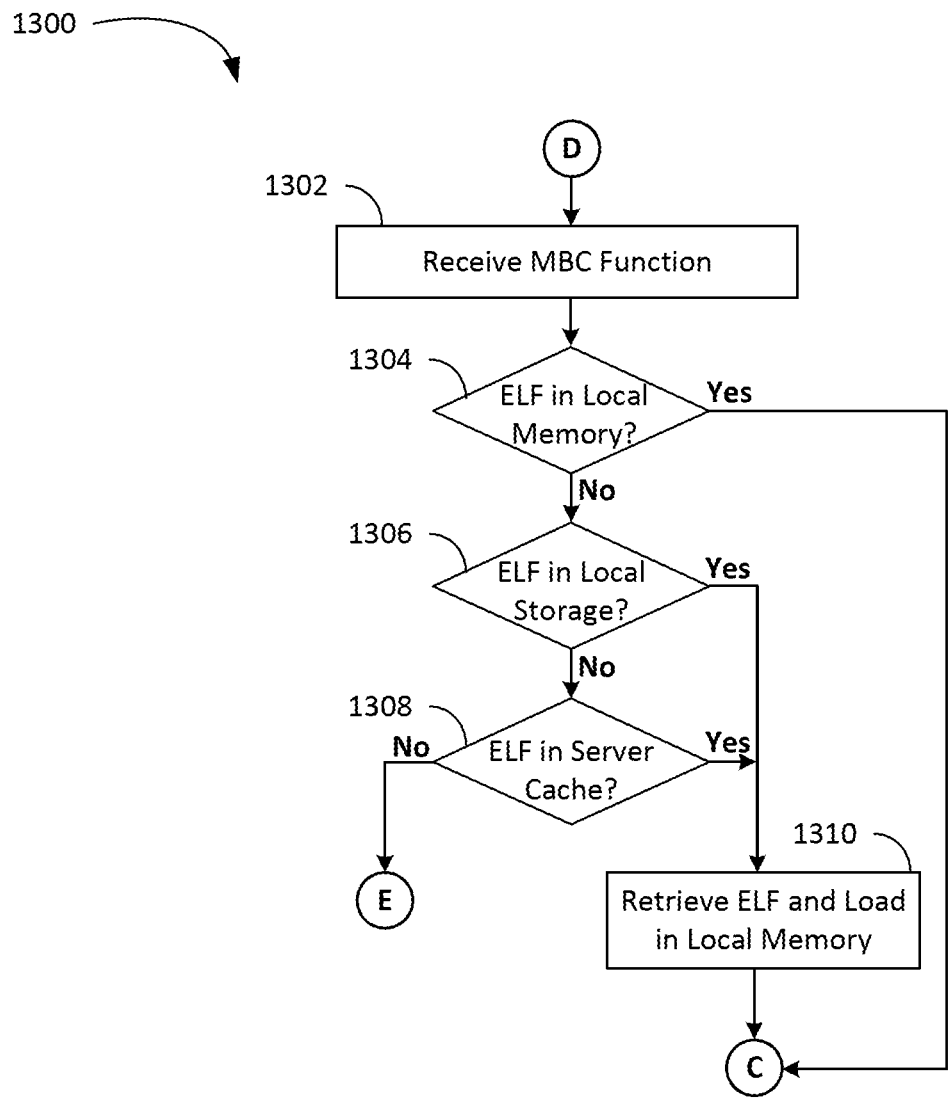
FIG. 13 illustrates a more detailed flowchart of the process of FIG. 12 for determining if the intermediate byte code function has been previously compiled, in accordance with some embodiments.

FIG. 13 illustrates a more detailed flowchart 1300 of the process of FIG. 12 for determining if the intermediate byte code function has been previously compiled, in accordance with some embodiments. For example, the flowchart 1300 illustrates, in more detail, some embodiments of the procedure for at least blocks 1208 and 1210 of FIG. 12. Flowchart 1300 initiates at block "D" from FIG. 12 and advances to block 1302, which includes receiving an MBC function. For example, as previously described in connection with FIG. 2, retriever 224 may receive MBC function(s) 222.

Flowchart 1300 advances from block 1302 to block 1304, which includes determining whether an ELF image (e.g., native or machine code) is stored in local memory, for example local memory 314, 324 (FIG. 3). If the determination at block 1304 is YES, flowchart 1300 advances to block "C", which is continued in FIG. 14.

If the determination at block 1304 is NO, flowchart 1300 advances from block 1304 to block 1306, which includes determining whether the ELF image (e.g., native or machine code) is stored in local storage, for example local storage 316, 326 (FIG. 3). If the determination at block 1306 is YES, flowchart 1300 advances to block 1310.

If the determination at block 1306 is NO, flowchart 1300 advances to block 1308, which includes determining whether the ELF image (e.g., native or machine code) is stored in a server cache, for example server cache 334 (FIG. 3). If the determination at block 1308 is YES, flowchart 1300 advances to block 1310. If the determination at block 1308 is NO, flowchart 1300 advances to block "E", which is continued in FIG. 14.

As noted above, upon arriving at block 1310 a determination has already been made that a corresponding ELF image is available and is currently being stored in a location other than local memory, e.g., in local storage or in server cache. Block 1310 includes retrieving the ELF image and loading it into local memory. For example, as previously described in connection with FIG. 2, loading the ELF image into loader 244. Thus, in flowchart 1300, the corresponding ELF image is either not available in any accessible storage and must be compiled, as will be described in FIG. 14, or is available and was already or is subsequently loaded into local memory where it can be executed.

Figure 14:
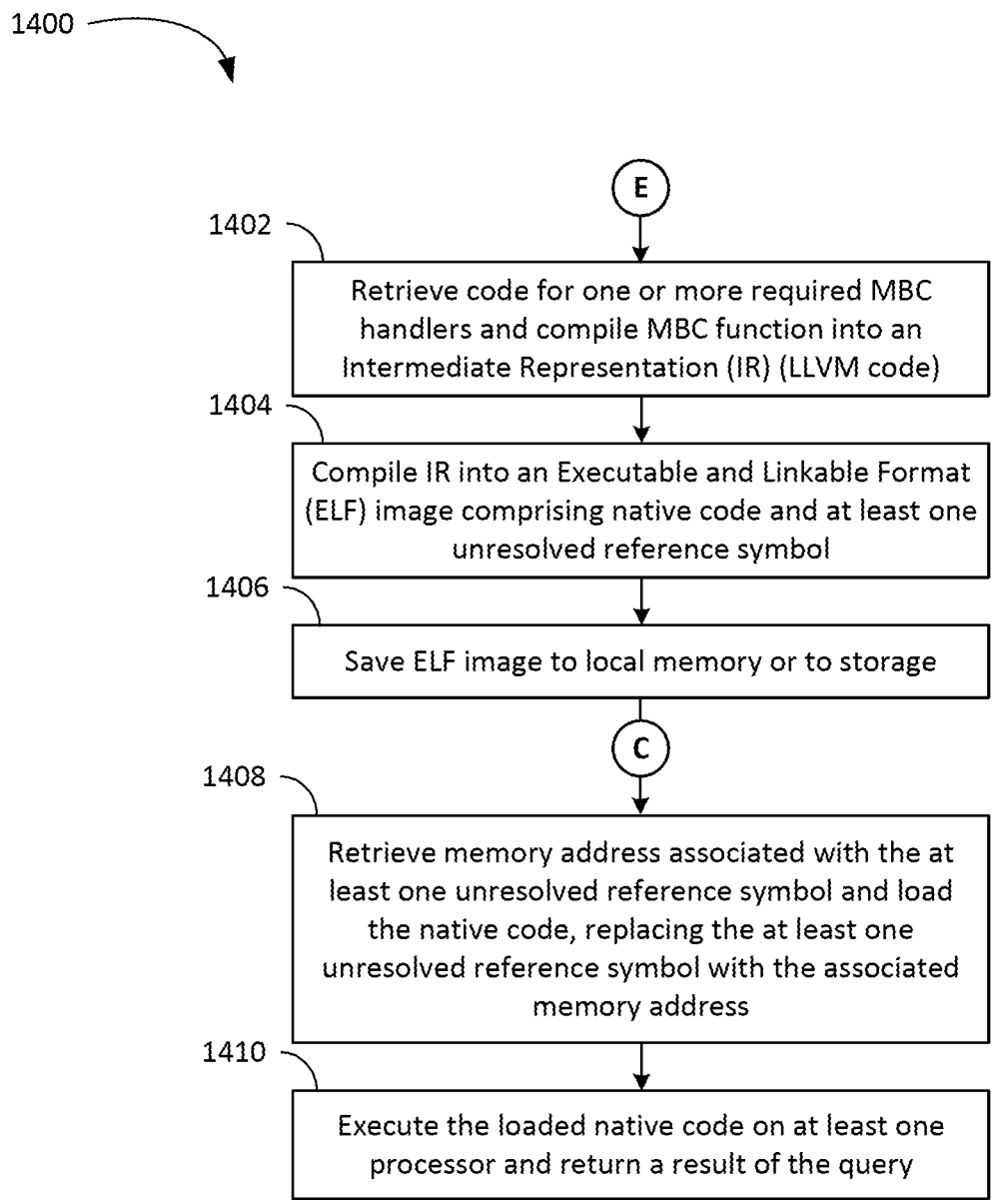
FIG. 14 illustrates a flowchart of a process for compiling an intermediate byte code function into machine code for execution, in accordance with some embodiments.

FIG. 14 illustrates a flowchart 1400 of a process for compiling an intermediate byte code function into machine code for execution, in accordance with some embodiments. Traversals of FIGS. 12 and 13 that flow to block "E", enter flowchart 1400 at block 1402, which includes retrieving code for one or more MBC handlers and compiling the MBC function into an intermediate representation (IR), e.g., low level virtual machine (LLVM) bitcode. For example, as previously described in connection with FIG. 2, front end 232 of meta-compilation engine 230 is configured to receive one or more MBC function(s) 222 for which compiled native or machine code has not been previously compiled and stored for subsequent retrieval. Front end 232 is also configured to retrieve code, for example from database 254, for one or more MBC handlers required to compile the one or more MBC function(s) 222 into LLVM bitcode 236.

Flowchart 1400 advances from block 1402 to block 1404, which includes compiling the intermediate representation (IR, e.g., LLVM bitcode) into an executable and linkable format (ELF) image comprising native or machine code and at least one unresolved symbol. For example, as previously described in connection with FIG. 2, back end 234 of meta-compilation engine 230 is configured to receive LLVM bitcode 236, and required code handlers in LLBM bitcode 238, and generate an ELF image comprising native or machine code and at least one unresolved symbol corresponding to the LLVM bitcode 236, as previously described.

Flowchart 1400 advances from block 1404 to block 1406, which includes saving the ELF image to a local memory or to storage. For example, as previously described in connection with FIG. 2, ELF image 240 may be persisted to code database 252, which may be either centrally located or distributed, in local memory, local storage, server cache, or even server storage. Thus, a next time a retrieval of ELF image 240 is attempted for a subsequent query, it will not have to be compiled but may instead be retrieved, which saves valuable computational overhead and time in executing subsequent queries.

Flowchart 1400 advances from block 1406 to block 1408, which includes retrieving a memory address associated with the at least one unresolved symbol and load the native code, replacing the at least one unresolved symbol with the associated memory address. For example, as previously described in connection with FIG. 2, loader 248 is configured to retrieve a memory address at which native or machine code corresponding to the unresolved symbol(s) is stored and replace the unresolved symbol(s) in ELF image 214, 228, 240 with the associated memory address. In this way, compilation time may be reduced in that the native or machine code stored at the memory address need not be transcribed into the ELF image directly. Instead, one or more processors executing the native code may jump directly to the memory address when read, requiring only the time needed to execute the jump during code execution.

Flowchart 1400 advances from block 1408 to block 1410, which includes executing the loaded native or machine code on at least one processor and return a result of the original SQL query. For example, as previously described in connection with FIG. 2, one or more processors 248 may execute the native or machine code comprising the one or more memory addresses corresponding to the previously embedded one or more unresolved symbols and return a result of the original SQL query 202.

For completeness, it is intended that the aspects described in connection with at least FIG. 14, along with related description described in connection with FIGS. 2 and 10-13, are understood to relate to inventive concepts. For example, one aspect is embodied as a method comprising obtaining a user query in a first programming language, the user query comprising at least one query parameter for selecting data from a content database; obtaining an executable and linkable format image, corresponding to a compiled version of the user query, by generating the executable and linkable format image comprising machine code that is executable directly by a processing system and at least one unresolved symbol, and storing the executable and linkable format image in a code database; retrieving a memory address identifying additional machine code corresponding to the at least one unresolved symbol and replacing the at least one unresolved symbol with the retrieved memory address; and executing the machine code in the executable and linkable format image and the additional machine code stored at the memory address using the at least one query parameter, thereby returning a result of the user query satisfying the at least one query parameter.

In some embodiments, the obtaining the executable and linkable format image is performed based on the executable and linkable format image not being previously stored in the code database. In some embodiments, the method further comprises, if the executable and linkable format image corresponding to the compiled version of the user query is stored in the code database, retrieving the executable and linkable format image. In some embodiments, obtaining the user query comprises receiving the user query, and parsing the user query to identify a skeletal query form of the user query in the first programming language and the at least one query parameter. In some embodiments, obtaining the executable and linkable format image, corresponding to a compiled version of the user query, further comprises generating code in a second programming language corresponding to a compiled version of the user query, generating byte code defining a plurality of functions corresponding to a compiled version of the code in the second programming language, and obtaining the executable and linkable format image comprising the machine code based on the byte code.

In some embodiments, obtaining the executable and linkable format image comprising the machine code based on the byte code comprises, for at least a subset of respective functions defined by the byte code, if machine code corresponding to a compiled version of the respective function is not stored in the code database: generating an intermediate representation of the respective function, and generating the machine code corresponding to the compiled version of the respective function based on the intermediate representation of the function; and generating the executable and linkable format by aggregating the machine code corresponding to the compiled version of each respective function defined by the byte code. In some embodiments, obtaining the executable and linkable format image comprising the machine code based on the byte code comprises: for at least a subset of respective functions defined by the byte code, if the machine code corresponding to a compiled version of the respective function is stored in the code database, retrieving the machine code corresponding to the compiled version of the respective function; and generating the executable and linkable format by aggregating the machine code corresponding to the compiled version of each respective function defined by the byte code. In some embodiments, the user query conforms to a Structured Query Language (SQL) query. Such embodiments may further extend to non-transitory computer readable medium comprising instructions which, when executed by a processing system, causes the processing system to perform any or all of the above described steps. Such embodiments may further extend to a system comprising a code database, a content database, and a processing system configured to perform any or all of the above described steps.

In interpreting the present application, it should be understood that the word "comprising" does not exclude the presence of other elements or acts than those listed and that the word "a" or "an" preceding an element does not exclude the presence of a plurality of such elements. Any reference signs do not limit the scope of the entities to which they refer. Several "means" may be represented by the same item or hardware or software implemented structure or function. Each of the disclosed elements may comprise a combination of hardware portions (e.g., including discrete and integrated electronic circuitry) and software portions (e.g., computer programming, instructions or code). Hardware portions may include one or more processors and/or memory, and software portions may be stored on a non-transitory, computer-readable medium, and may be configured to cause such one or more processors to perform some or all of the functions of one or more of the disclosed elements. Hardware portions may be comprised of one or both of analog and digital portions. Any of the disclosed devices or portions thereof may be combined together or separated into further portions unless specifically stated otherwise. No specific sequence of acts is intended to be required unless specifically indicated. The term "plurality of" an element includes two or more of the claimed element, and does not imply any particular range of number of elements; that is, a plurality of elements can be as few as two elements, and can include an immeasurable number of elements.

What is claimed is:
1. A method, comprising:
   obtaining a user query in a query language, the user query comprising at least one query parameter for selecting data from a content database;

obtaining machine code that is executable directly by a processing system, corresponding to a compiled version of the user query, by:
  parsing the user query to identify a skeletal form of the user query in the structured query language;
  generating byte code defining a plurality of functions corresponding to a compiled version of the skeletal form of the user query, and
  obtaining the machine code corresponding to the compiled version of the user query based on the byte code, by retrieving compiled machine code for the byte code defining one or more of the plurality of functions if available or generating machine code for the byte code defining one or more of the plurality of functions when not available;
  wherein the machine code corresponding to the compiled version of the user query comprises at least one unresolved symbol and obtaining the machine code comprises:
    retrieving a memory address at which additional machine code corresponding to the at least one unresolved symbol is stored;
    replacing the at least one unresolved symbol with the corresponding memory address; and
  executing the machine code corresponding to the compiled version of the user query using the at least one query parameter, thereby returning a result of the user query satisfying the at least one query parameter.

2. The method of claim 1, wherein obtaining the machine code corresponding to the compiled version of the user query based on the byte code comprises:
  for at least a subset of respective functions defined by the byte code, if machine code corresponding to a compiled version of the respective function is not stored in a code database:
    generating an intermediate representation of the respective function; and
    generating the machine code corresponding to the compiled version of the respective function based on the intermediate representation of the function; and
  generating the machine code corresponding to the compiled version of the user query by aggregating the machine code corresponding to the compiled version of each respective function defined by the byte code.

3. The method of claim 1, wherein obtaining the machine code corresponding to the compiled version of the user query based on the byte code comprises:
  for at least a subset of respective functions defined by the byte code, if the machine code corresponding to a compiled version of the respective function is stored in a code database, retrieving the machine code corresponding to the compiled version of the respective function; and
  generating the machine code corresponding to the compiled version of the user query by aggregating the machine code corresponding to the compiled version of each respective function defined by the byte code.

4. The method of claim 1, wherein the user query conforms to a Structured Query Language (SQL) query.

5. The method of claim 1, further comprising storing the machine code corresponding to the compiled version of at least one respective function defined by the byte code in a code database.

6. The method of claim 1, wherein a code database is stored in at least one of a local memory, a local storage, and a server cache.

7. A non-transitory computer readable medium comprising instructions which, when executed by a processing system, causes the processing system to:
  obtain a user query in a query language, the user query comprising at least one query parameter for selecting data from a content database;
  obtain machine code that is executable directly by a processing system, corresponding to a compiled version of the user query, by:
    parsing the user query to identify a skeletal form of the user query in the structured query language;
    generating byte code defining a plurality of functions corresponding to a compiled version of the skeletal form of the user query, and
    obtaining the machine code corresponding to the compiled version of the user query based on the byte code, by retrieving compiled machine code for the byte code defining one or more of the plurality of functions if available or generating machine code for the byte code defining one or more of the plurality of functions when not available;
    wherein the machine code corresponding to the compiled version of the user query comprises at least one unresolved symbol and obtaining the machine code comprises:
      retrieving a memory address at which additional machine code corresponding to the at least one unresolved symbol is stored;
      replacing the at least one unresolved symbol with the corresponding memory address; and
  execute the machine code corresponding to the compiled version of the user query using the at least one query parameter, thereby returning a result of the user query satisfying the at least one query parameter.

8. The medium of claim 7, wherein obtaining the machine code corresponding to the compiled version of the user query based on the byte code comprises the processing system:
  for at least a subset of respective functions defined by the byte code, if machine code corresponding to a compiled version of the respective function is not stored in a code database:
    generating an intermediate representation of the respective function; and
    generating the machine code corresponding to the compiled version of the respective function based on the intermediate representation of the function; and
  generating the machine code corresponding to the compiled version of the user query by aggregating the machine code corresponding to the compiled version of each respective function defined by the byte code.

9. The medium of claim 7, wherein obtaining the machine code corresponding to the compiled version of the user query based on the byte code comprises the processing system:
  for at least a subset of respective functions defined by the byte code, if the machine code corresponding to a compiled version of the respective function is stored in a code database, retrieving the machine code corresponding to the compiled version of the respective function; and
  generating the machine code corresponding to the compiled version of the user query by aggregating the machine code corresponding to the compiled version of each respective function defined by the byte code.

10. The medium of claim 7, wherein the instructions, when executed by the processing system, cause the processing system to further store the machine code corresponding to the compiled version of the user query in a code database.

11. The medium of claim 7, wherein the instructions, when executed by the processing system, cause the processing system to further store the machine code corresponding to the compiled version of at least one respective function defined by the byte code in a code database.

12. A system comprising:
  a code database;
  a content database; and
  a processing system configured to:
    obtain a user query in a query language, the user query comprising at least one query parameter for selecting data from a content database;
    obtain machine code that is executable directly by a processing system, corresponding to a compiled version of the user query, by:
      parsing the user query to identify a skeletal form of the user query in the structured query language;
      generating byte code defining a plurality of functions corresponding to a compiled version of the skeletal form of the user query, and
      obtaining the machine code corresponding to the compiled version of the user query based on the byte code, by retrieving compiled machine code for the byte code defining one or more of the plurality of functions if available or generating machine code for the byte code defining one or more of the plurality of functions when not available;
    wherein the machine code corresponding to the compiled version of the user query comprises at least one unresolved symbol and obtaining the machine code comprises:
      retrieving a memory address at which additional machine code corresponding to the at least one unresolved symbol is stored; and
      replacing the at least one unresolved symbol with the corresponding memory address; and
    execute the machine code corresponding to the compiled version of the user query using the at least one query parameter, thereby returning a result of the user query satisfying the at least one query parameter.

* * * * *